(12) United States Patent
Chuang et al.

(10) Patent No.: US 10,003,810 B2
(45) Date of Patent: Jun. 19, 2018

(54) METHOD AND APPARATUS OF SCALABLE VIDEO CODING

(71) Applicant: MEDIATEK INC., Hsin-Chu (TW)

(72) Inventors: Tzu-Der Chuang, Hsinchu County (TW); Ching-Yeh Chen, Taipei (TW); Yu-Wen Huang, Taipei (TW); Jian-Liang Lin, Yilan County (TW); Yi-Wen Chen, Taichung (TW); Shih-Ta Hsiang, New Taipei (TW); Shan Liu, San Jose, CA (US); Shaw-Min Lei, Hsinchu County (TW)

(73) Assignee: MEDIATEK INC., Hsin-chu (TW)

( * ) Notice: Subject to any disclaimer, the term of this patent is extended or adjusted under 35 U.S.C. 154(b) by 132 days.

(21) Appl. No.: 14/378,965

(22) PCT Filed: Mar. 19, 2013

(86) PCT No.: PCT/CN2013/072848
§ 371 (c)(1),
(2) Date: Aug. 14, 2014

(87) PCT Pub. No.: WO2013/139250
PCT Pub. Date: Sep. 26, 2013

(65) Prior Publication Data
US 2015/0281708 A1 Oct. 1, 2015

Related U.S. Application Data
(60) Provisional application No. 61/614,241, filed on Mar. 22, 2012, provisional application No. 61/667,247, filed on Jul. 2, 2012.

(51) Int. Cl.
H04N 19/33 (2014.01)
H04N 19/52 (2014.01)
(Continued)

(52) U.S. Cl.
CPC ............. *H04N 19/33* (2014.11); *H04N 19/52* (2014.11); *H04N 19/577* (2014.11); *H04N 19/96* (2014.11)

(58) Field of Classification Search
CPC ....... H04N 19/30; H04N 19/577; H04N 19/52
See application file for complete search history.

(56) References Cited

U.S. PATENT DOCUMENTS

2009/0304084 A1* 12/2009 Hallapuro ............... H04N 19/52
375/240.16
2012/0075436 A1* 3/2012 Chen .................... H04N 19/597
348/51
(Continued)

FOREIGN PATENT DOCUMENTS

CN 101129072 A 2/2008
EP 1806930 A1 7/2007
(Continued)

OTHER PUBLICATIONS

Ebrahimi, T.; "A quick overview of HEVC;" Multimedia Signal Processing Group; Dec. 2011; pp. 1-62.
(Continued)

*Primary Examiner* — Zhubing Ren
(74) *Attorney, Agent, or Firm* — Oblon, McClelland, Maier & Neustadt, L.L.P.

(57) ABSTRACT

A method and apparatus for coding video data using Inter prediction mode or Merge mode in a video coding system are disclosed, where the video data is configured into a Base Layer (BL) and an Enhancement Layer (EL), and the EL has higher spatial resolution or better video quality than the BL. In one embodiment, at least one information piece of motion information associated with one or more BL blocks in the BL is identified. A motion vector prediction (MVP) candidate list or a Merge candidate list for the selected block in the EL is then determined, where said at least one informa-
(Continued)

tion piece associated with said one or more BL blocks in the BL is included in the MVP candidate list or the Merge candidate list. The input data associated with the selected block is coded or decoded using the MVP candidate list or the Merge candidate list.

14 Claims, 6 Drawing Sheets

(51) Int. Cl.
*H04N 19/577* (2014.01)
*H04N 19/96* (2014.01)

(56) References Cited

U.S. PATENT DOCUMENTS

2012/0163466 A1* 6/2012 Sugio ................ H04N 19/139
375/240.16
2013/0003847 A1* 1/2013 Hong ..................... H04N 19/52
375/240.16
2013/0188719 A1* 7/2013 Chen ................ H04N 19/00684
375/240.16

FOREIGN PATENT DOCUMENTS

WO        2011076737 A1     6/2011
WO    WO 2012/167711     12/2012

OTHER PUBLICATIONS

Sullivan, G.J., et al; "Overview of the High Efficiency Video Coding (HEVC) Standard;" pp. 1-20.
Sjoberg, R., et al.; "Overview of HEVC high-level syntax and reference picture management" IEEE; 2012; pp. 1-14.

* cited by examiner

METHOD AND APPARATUS OF SCALABLE VIDEO CODING

CROSS REFERENCE TO RELATED APPLICATIONS

The present invention claims priority to U.S. Provisional Patent Application Ser. No. 61/614,241, filed Mar. 22, 2012, entitled "Scalable Video Coding Extension of High Efficiency Video Coding" and U.S. Provisional Patent Application Ser. No. 61/667,247, filed Jul. 2, 2012, entitled "Syntax Prediction for Scalable High Efficiency Video Coding". The U.S. Provisional Patent Applications are hereby incorporated by reference in their entireties.

TECHNICAL FIELD

The present invention relates to video coding. In particular, the present invention relates to scalable video coding that utilizes motion information of the base layer for enhancement layer coding.

BACKGROUND

Compressed digital video has been widely used in various applications such as video streaming over digital networks and video transmission over digital channels. Very often, a single video content may be delivered over networks with different characteristics. For example, a live sport event may be carried in a high-bandwidth streaming format over broadband networks for premium video service. In such applications, the compressed video usually preserves high resolution and high quality so that the video content is suited for high-definition devices such as an HDTV or a high resolution LCD display. The same content may also be carried through cellular data network so that the content can be watch on a portable device such as a smart phone or a network-connected portable media device. In such applications, due to the network bandwidth concerns as well as the typical low-resolution display on the smart phone or portable devices, the video content usually is compressed into lower resolution and lower bitrates. Therefore, for different network environment and for different applications, the video resolution and video quality requirements are quite different. Even for the same type of network, users may experience different available bandwidths due to different network infrastructure and network traffic condition. Therefore, a user may desire to receive the video at higher quality when the available bandwidth is high and receive a lower-quality, but smooth, video when the network congestion occurs. In another scenario, a high-end media player can handle high-resolution and high bitrate compressed video while a low-cost media player is only capable of handling low-resolution and low bitrate compressed video due to limited computational resources. Accordingly, it is desirable to construct the compressed video in a scalable manner so that videos at different spatial-temporal resolution and/or quality can be derived from the same compressed bitstream.

The joint video team (JVT) of ISO/IEC MPEG and ITU-T VCEG standardized a Scalable Video Coding (SVC) extension of the H.264/AVC standard. An H.264/AVC SVC bitstream can contain video information from low frame-rate, low resolution, and low quality to high frame rate, high definition, and high quality. This single bitstream can be adapted to various applications and displayed on devices with different configurations. Accordingly, H.264/AVC SVC is suitable for various video applications such as video broadcasting, video streaming, and video surveillance to adapt to network infrastructure, traffic condition, user preference, and etc.

In SVC, three types of scalabilities, i.e., temporal scalability, spatial scalability, and quality scalability, are provided. SVC uses multi-layer coding structure to realize the three dimensions of scalability. A main goal of SVC is to generate one scalable bitstream that can be easily and rapidly adapted to the bit-rate requirement associated with various transmission channels, diverse display capabilities, and different computational resources without trans-coding or re-encoding. An important feature of the SVC design is that the scalability is provided at a bitstream level. In other words, bitstreams for deriving video with a reduced spatial and/or temporal resolution can be simply obtained by extracting Network Abstraction Layer (NAL) units (or network packets) from a scalable bitstream that are required for decoding the intended video. NAL units for quality refinement can be additionally truncated in order to reduce the bit-rate and the associated video quality.

For example, temporal scalability can be derived from hierarchical coding structure based on B-pictures according to the H.264/AVC standard. FIG. 1 illustrates an example of hierarchical B-picture structure with 4 temporal layers and the Group of Pictures (GOP) with eight pictures. Pictures 0 and 8 in FIG. 1 are called key pictures. Inter prediction of key pictures only uses previous key pictures as references. Other pictures between two key pictures are predicted hierarchically. A video having only the key pictures forms the coarsest temporal resolution of the scalable system. Temporal scalability is achieved by progressively refining a lower-level (coarser) video by adding more B pictures corresponding to enhancement layers of the scalable system. In the example of FIG. 1, picture 4 is first bi-directionally predicted using key pictures, i.e., pictures 0 and 8 after the two key pictures are coded. After picture 4 is processed, pictures 2 and 6 are processed. Picture 2 is hi-directionally predicted using picture 0 and 4, and picture 6 is bi-directionally predicted using picture 4 and 8. After pictures 2 and 6 are coded, remaining pictures, i.e., pictures 1, 3, 5 and 7 are processed bi-directionally using two respective neighboring pictures as shown in FIG. 1. Accordingly, the processing order for the GOP is 0, 8, 4, 2, 6, 1, 3, 5, and 7. The pictures processed according to the hierarchical process of FIG. 1 results in hierarchical four-level pictures, where pictures 0 and 8 belong to the first temporal order, picture 4 belongs the second temporal order, pictures 2 and 6 belong to the third temporal order and pictures 1, 3, 5, and 7 belong to the fourth temporal order. By decoding the base level pictures and adding higher temporal order pictures will be able to provide a higher level video. For example, base-level pictures 0 and 8 can be combined with second temporal-order picture 4 to form second-level pictures. By further adding the third temporal-order pictures to the second-level video can form the third-level video. Similarly, by adding the fourth temporal-order pictures to the third-level video can form the fourth-level video. Accordingly, the temporal scalability is achieved. If the original video has a frame rate of 30 frames per second, the base-level video has a frame rate of 30/8=3.75 frames per second. The second-level, third-level and fourth-level video correspond to 7.5, 15, and 30 frames per second. The first temporal-order pictures are also called base-level video or based-level pictures. The second temporal-order pictures through fourth temporal-order pictures are also called enhancement-level video or enhancement-level pictures. In addition to enable temporal scalability, the coding structure of hierarchical B-pictures also improves the coding efficiency over the typical IBBP GOP structure at the cost of increased encoding-decoding delay.

In SVC, spatial scalability is supported based on the pyramid coding scheme as shown in FIG. 2. In a SVC system with spatial scalability, the video sequence is first down-sampled to obtain smaller pictures at different spatial resolutions (layers). For example, picture 210 at the original resolution can be processed by spatial decimation 220 to obtain resolution-reduced picture 211. The resolution-reduced picture 211 can be further processed by spatial decimation 221 to obtain further resolution-reduced picture 212 as shown in FIG. 2. In addition to dyadic spatial resolution, where the spatial resolution is reduced to half in each level, SVC also supports arbitrary resolution ratios, which is called extended spatial scalability (ESS). The SVC system in FIG. 2 illustrates an example of spatial scalable system with three layers, where layer 0 corresponds to the pictures with lowest spatial resolution and layer 2 corresponds to the pictures with the highest resolution. The layer-0 pictures are coded without reference to other layers, i.e., single-layer coding. For example, the lowest layer picture 212 is coded using motion-compensated and Intra prediction 230.

The motion-compensated and Intra prediction 230 will generate syntax elements as well as coding related information such as motion information for further entropy coding 240. FIG. 2 actually illustrates a combined SVC system that provides spatial scalability as well as quality scalability (also called SNR scalability). The system may also provide temporal scalability, which is not explicitly shown. For each single-layer coding, the residual coding errors can be refined using SNR enhancement layer coding 250. The SNR enhancement layer in FIG. 2 may provide multiple quality levels (quality scalability). Each supported resolution layer can be coded by respective single-layer motion-compensated and Intra prediction like a non-scalable coding system. Each higher spatial layer may also be coded using inter-layer coding based on one or more lower spatial layers. For example, layer 1 video can be adaptively coded using inter-layer prediction based on layer 0 video or a single-layer coding on a macroblock by macroblock basis or other block unit. Similarly, layer 2 video can be adaptively coded using inter-layer prediction based on reconstructed layer 1 video or a single-layer coding. As shown in FIG. 2, layer-1 pictures 211 can be coded by motion-compensated and Intra prediction 231, base layer entropy coding 241 and SNR enhancement layer coding 251. Similarly, layer-2 pictures 210 can be coded by motion-compensated and Intra prediction 232, base layer entropy coding 242 and SNR enhancement layer coding 252. The coding efficiency can be improved due to inter-layer coding. Furthermore, the information required to code spatial layer 1 may depend on reconstructed layer 0 (inter-layer prediction). A higher layer in an SVC system is referred as an enhancement layer. The H.264 SVC provides three types of inter-layer prediction tools: inter-layer motion prediction, inter-layer Intra prediction, and inter-layer residual prediction.

In SVC, the enhancement layer (EL) can reuse the motion information in the base layer (BL) to reduce the inter-layer motion data redundancy. For example, the EL macroblock coding may use a flag, such as base_mode_flag before mb_type is determined to indicate whether the EL motion information is directly derived from the BL. If base_mode_flag is equal to 1, the partitioning data of the EL macroblock along with the associated reference indexes and motion vectors are derived from the corresponding data of the collocated 8×8 block in the BL. The reference picture index of the BL is directly used in the EL. The motion vectors of the EL are scaled from the data associated with the BL. Besides, the scaled BL motion vector can be used as an additional motion vector predictor for the EL.

Inter-layer residual prediction uses the up-sampled BL residual information to reduce the information required for coding the EL residuals. The collocated residual of the BL can be block-wise up-sampled using a bilinear filter and can be used as prediction for the residual of a corresponding macroblock in the EL. The up-sampling of the reference layer residual is done on transform block basis in order to ensure that no filtering is applied across transform block boundaries.

Similar to inter-layer residual prediction, the inter-layer Intra prediction reduces the redundant texture information of the EL. The prediction in the EL is generated by block-wise up-sampling the collocated BL reconstruction signal. In the inter-layer Intra prediction up-sampling procedure, 4-tap and 2-tap FIR filters are applied for luma and chroma components, respectively. Different from inter-layer residual prediction, filtering for the inter-layer Intra prediction is always performed across sub-block boundaries. For decoding simplicity, inter-layer Intra prediction can be applied only to the intra-coded macroblocks in the BL.

In SVC, quality scalability is realized by coding multiple quality ELs that are composed of refinement coefficients. The scalable video bitstream can be easily truncated or extracted to provide different video bitstreams with different video qualities or bitstream sizes. In SVC, the quality scalability, (also called SNR scalability) can be provided via two strategies, coarse grain scalability (CGS), and medium grain scalability (MGS). The CGS can be regarded as a special case of spatial scalability, where the spatial resolution of the BL and the EL are the same. However, the quality of the EL is better (the QP of the EL is smaller than the QP of the BL). The same inter-layer prediction mechanism for spatial scalable coding can be employed. However, no corresponding up-sampling or deblocking operations are performed. Furthermore, the inter-layer Intra and residual prediction are directly performed in the transform domain. For inter-layer prediction in CGS, a refinement of texture information is typically achieved by re-quantizing the residual signal in the EL with a smaller quantization step size than that used for the preceding CGS layer. CGS can provide multiple pre-defined quality points.

To provide finer bit rate granularity while maintaining reasonable complexity for quality scalability, MGS is used by H.264 SVC. MGS can be considered as an extension of CGS, where the quantized coefficients in one CGS slice can be divided into several MGS slices. The quantized coefficients in CGS are classified to 16 categories based on its scan position in the zig-zag scan order. These 16 categories of coefficients can be distributed into different slices to provide more quality extraction points than CGS.

Predictive coding using motion information associated with previously coded video data is a powerful tool in advanced video coding. The previously coded video data may correspond to previously coded picture frames when an Inter coding mode is used. The previously coded video data may correspond to neighboring blocks already coded when an Intra coding mode is used. A block (i.e., prediction unit or PU) may reuse motion information from a corresponding block in a previously coded frame (Inter mode) or a neighboring block in the same frame (Intra mode). In this case (i.e., Merge mode), there is no need to transmit the motion information other than a Merge index to identify the block for sharing motion information. For the Inter mode, Motion Vector Prediction (MVP) scheme is used to select motion information associated with an MVP candidate in the MVP candidate list to code a current block. It is desirable to improve coding efficiency by using motion information from a lower layer for coding a block of a higher layer in a scalable coding system.

In the current HEVC, it only provides single layer coding based on hierarchical-B coding structure without any spatial scalability and quality scalability. It is desirable to provide the capability of spatial scalability and quality scalability to the current HEVC. Furthermore, it is desirable to provide improved SVC over the H.264 SVC to achieve higher efficiency and/or more flexibility.

SUMMARY

A method and apparatus for coding video data using Inter prediction mode or Merge mode in a video coding system are disclosed, where the video data is configured into a Base Layer (BL) and an Enhancement Layer (EL), and the EL has higher spatial resolution or better video quality than the BL. In one embodiment according to the present invention, the method comprises receiving information associated with input data corresponding to a selected block in the EL from a media or a processor and identifying at least one information piece of motion information associated with one or more BL blocks in the BL. A motion vector prediction (MVP) candidate list or a Merge candidate list for the selected block in the EL is then determined, where said at least one information piece associated with said one or more BL blocks in the BL is included in the MVP candidate list or the Merge candidate list. The input data associated with the selected block can be coded or decoded using the MVP candidate list or the Merge candidate list.

In one embodiment, said at least one information piece associated with said one or more BL blocks is added to the MVP candidate list or the Merge candidate list, or replaces at least one candidate of the MVP candidate list or the Merge candidate list. In another embodiment, said at least one information piece associated with said one or more BL blocks is added to the MVP candidate list or the Merge candidate list, or replaces the EL temporal collocated MVP or Merge candidate in the MVP candidate list or the Merge candidate list. Said one or more BL blocks may correspond to one or more blocks in the BL collocated with the selected block in the EL. Said one or more BL blocks in the BL may also correspond to more than one collocated blocks in the BL, and motion vectors associated with said more than one collocated blocks are used to derive at least one inter-layer candidate of the MVP candidate list or the Merge candidate list. When more than one collocated blocks are used, a predefined search order may be used to derive said at least one inter-layer candidate of the MVP candidate list or the Merge candidate list from said more than one collocated blocks in the BL. In another embodiment, an EL block collocated with the selected block in the EL is excluded from said deriving the MVP candidate list or the Merge candidate list for the selected block in the EL. In another embodiment, the EL temporal collocated MVP or Merge candidate is excluded from said deriving the MVP candidate list or the Merge candidate list for the selected block in the EL. In yet another embodiment, candidate ordering of the MVP candidate list or the Merge candidate list is adaptively changed based on a Merge index or said at least one information piece. The motion information may be associated with a prediction unit (PU) in a previous or selected coded picture in the BL, a neighboring PU of the PU, Merge candidates of the first PU, motion vector predictors of the first PU, or a collocated PU of the first PU, where the motion information comprises Inter prediction direction, reference picture index, and motion vectors, and where the selected block in the EL corresponds to a selected PU in the EL.

Said at least one information piece may correspond to a BL motion vector, and the BL motion vector is scaled based on a resolution ratio of the EL to the BL. A flag can be used to indicate whether complete motion information or partial motion information of the selected block in the EL is predicted based on the motion information associated with said one or more BL blocks in the BL. An inter-layer candidate of the MVP candidate list or the Merge candidate list associated with said one or more BL blocks in the BL can be used to replace a second candidate of the MVP candidate list or the Merge candidate list associated with a second block in the EL, where the second candidate is unavailable or redundant. An inter-layer candidate of the MVP candidate list or the Merge candidate list associated with said one or more BL blocks in the BL can also be used as the first candidate of the MVP candidate list or the Merge candidate list associated with another block in the EL. If the motion information associated with the selected block in the EL is unavailable, the motion information associated with a corresponding block in the BL can be used as the motion information associated with the selected block in the EL. In one embodiment, redundancy check with an inter-layer candidate is performed during derivation of the MVP candidate list or the Merge candidate list when a spatial candidate or a temporal candidate is to be added to the MVP candidate list or the Merge candidate list, where the inter-layer candidate associated with said one or more BL blocks in the BL is already in the MVP candidate list or the Merge candidate list respectively. In another embodiment, redundancy check with a spatial candidate or a temporal candidate is performed during derivation of the MVP candidate list or the Merge candidate list when an inter-layer candidate associated with said one or more BL blocks in the BL is to be added to the MVP candidate list or the Merge candidate list, where the spatial candidate or the temporal candidate is already in the MVP candidate list or the Merge candidate list respectively. If more than one inter-layer candidate associated with said one or more BL blocks are in the BL, redundancy check with each other is performed on said more than one inter-layer candidate.

Another method and apparatus for coding video data in a video coding system are disclosed, where the video data is configured into a Base Layer (BL) and an Enhancement Layer (EL), and the EL has higher spatial resolution than the BL. The method comprises receiving input data associated with the EL from a media or a processor, determining motion data associated with sub-blocks of the BL; coding the input data associated with the EL using prediction information including the motion data associated with the sub-blocks of the BL; and compressing the motion data associated with the sub-blocks of the BL by using representative motion data for a plurality of sub-blocks in a compression region, wherein said compressing the motion data is performed after said coding the input data associated with the EL, and the compressed motion data is stored for use by other video frames. The plurality of the sub-blocks may correspond to N×N sub-blocks, N is a positive integer, and N is pre-defined or information associated with N is incorporated in a slice level, a picture level or a sequence level. The representative motion data may be selected based on the motion data associated with one of the plurality of the sub-blocks or based on majority of the motion data associated with the plurality of the sub-blocks. Said one of the plurality of the sub-blocks may correspond to a corner sub-block at top-left sub-block, top-right block, bottom-left sub-block or bottom-right sub-block, or may correspond to a central sub-block at top-left-to-the-center sub-block, top-right-to-the-center sub-block, bottom-left-to-the-center sub-block or bottom -right-to-the-center sub-block. The position of said one of the plurality of the sub-blocks may be pre-defined or information associated with the position is incorporated in a slice level, a picture level or a sequence level. A syntax element may be implicitly inferred or explicitly signaled to indicate whether said compressing the motion data is performed after said coding the input data associated with the EL or after all layers of the same access unit are processed, wherein the syntax is incorporated in a slice level, a picture level or a sequence level.

DETAILED DESCRIPTION

Figure 1:
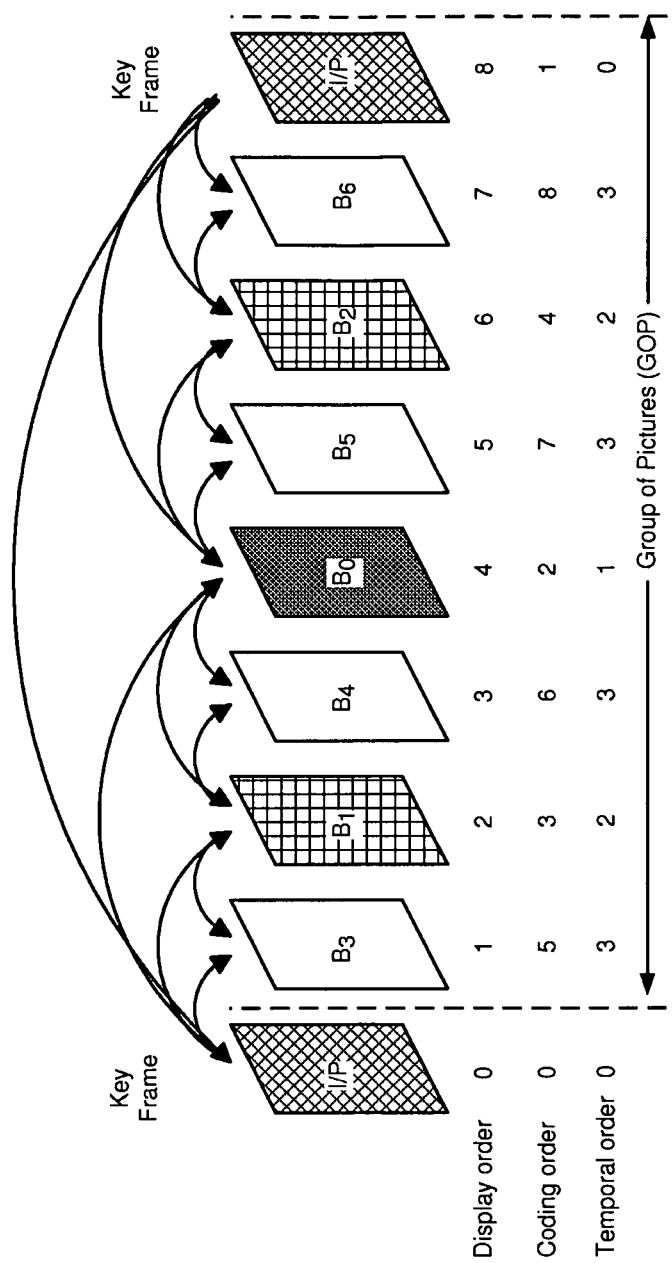
FIG. 1 illustrates an example of temporal scalable video coding using hierarchical B-pictures.
Figure 2:
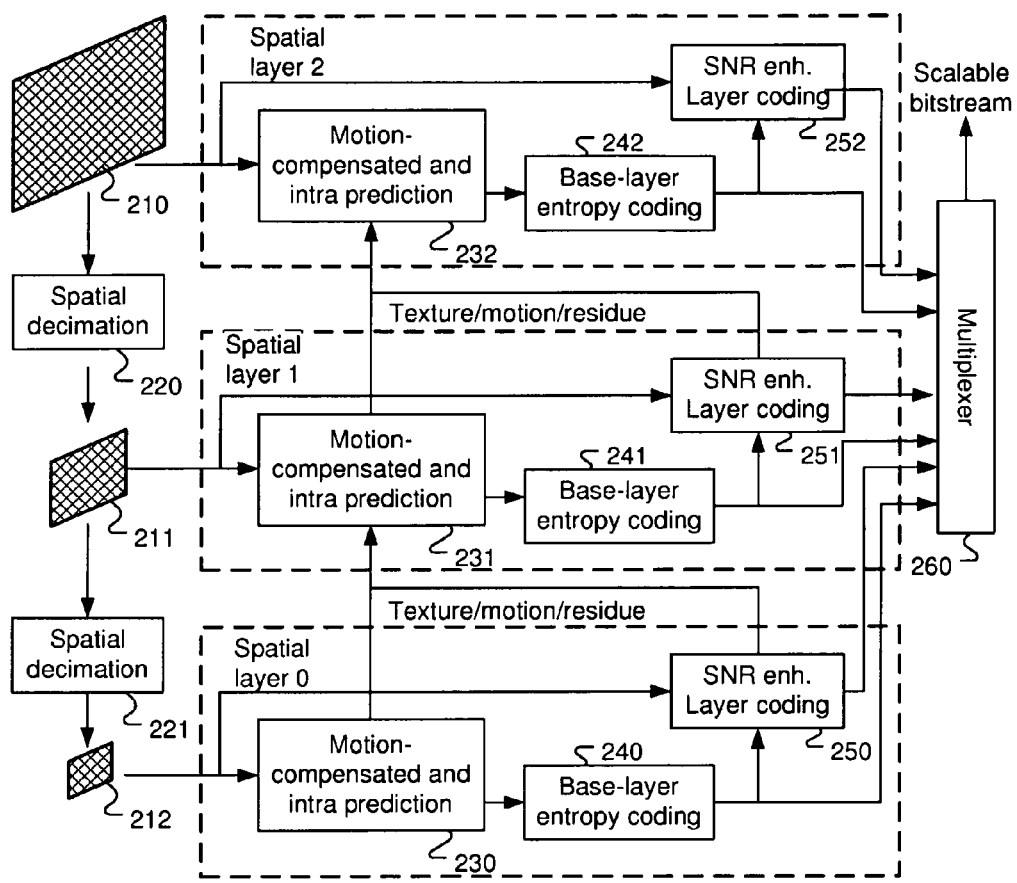
FIG. 2 illustrates an example of a combined scalable video coding system that provides spatial scalability as well as quality scalability, where three spatial layers are provided.
Figure 3:
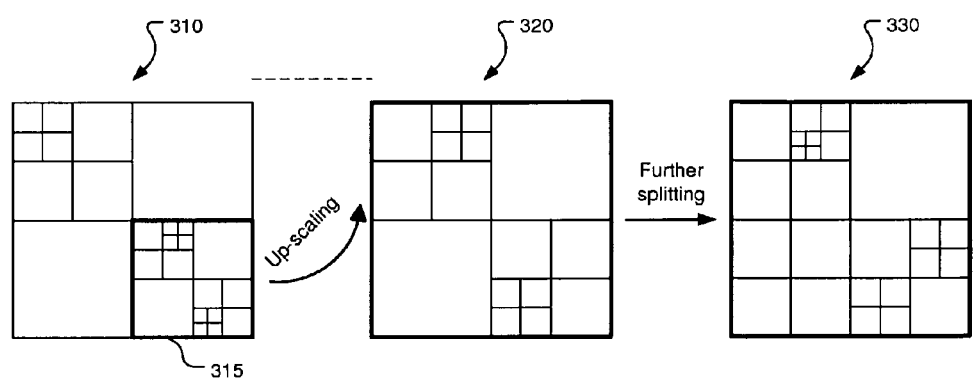
FIG. 3 illustrates an example of CU structure reuse for scalable video coding, where a CU structure for the base layer is scaled and used as an initial CU structure for an enhancement layer.

In HEVC, coding unit (CU) structure was introduced as a new block structure for coding process. A picture is divided into largest CUs (LCUs) and each LCU is adaptively partitioned into CUs until a leaf CU is obtained or a minimum CU size is reached. The CU structure information has to be conveyed to the decoder side so that the same CU structure can be recovered at the decoder side. In order to improve coding efficiency associated with the CU structure for a scalable HEVC, the CU structure of the BL may be reused by the EL. In the EL LCU or CU level, one flag is transmitted to indicate whether the CU structure is reused from the corresponding CU of the BL. The EL LCU and the EL CU refer to the LCU in the EL and the CU in the EL respectively. If the BL CU structure is reused, the BL CU structure is scaled to match the resolutions of the EL and the scaled BL CU structure is reused by the EL. The BL LCU and the BL CU refer to the LCU in the BL and the CU in the BL respectively. The CU structure information that can be reused by the EL includes the CU split flag and residual quad-tree split flag. Moreover, the leaf CU of the scaled CU structures can be further split into sub-CUs. FIG. 3 illustrates an example of the CU partition reuse. Partition 310 corresponds to the CU structure of the BL. The picture resolution of the EL is two times of the picture resolution of the BL horizontally and vertically. The CU structure of the corresponding CU partition 315 (shown as a thick-lined box) of the BL is scaled up by 2. The scaled CU structure 320 is then used as the initial CU structure for the EL LCU. The leaf CUs of the scaled CU in the EL can be further split into sub-CUs and the result is illustrates by CU partition 330 in FIG. 3. A flag may be used to indicate whether the leaf CU is further divided into sub-CUs. While FIG. 3 illustrates an example of the CU structure being reused, other information may also be reused. For example, the prediction type, prediction size, Merge index, inter reference direction, reference picture index, motion vectors, MVP index, and Intra mode may also be reused. The information/data can be scaled when needed before the information/data is reused in the EL.

Not only the CU structure can be reused, but also other information may be reused at the same time. For example, the CU prediction mode, the CU partitioning mode, the merging candidate index, the Inter prediction flag (inter_pred_flag), the reference picture index, the motion vectors, the MVP index, the Intra prediction mode, etc., can be scaled (if needed) and reused.

Mode Information Reuse in One Leaf CU The mode information, including the Skip flag, the CU prediction mode, the CU partitioning mode, the merging candidate index, the Inter prediction flag, the reference picture index, the motion vectors, the MVP index, the Intra prediction mode, etc., of the leaf CU in the EL can share the same mode information or scaled mode information of the corresponding CU in the BL. A flag may be used to indicate whether the EL will reuse the mode information from the BL or not. For each piece of the mode information or more than one piece of information, a flag may be used to indicate whether the EL will reuse the mode information from the BL or not.

Motion Information Reuse The motion information of the corresponding PU in the BL, including the CU prediction mode, the CU partitioning mode, the merging candidate index, the Inter prediction flag, the reference picture index, the motion vectors, and the MVP index, Merge candidates, etc., can be used as predictors or candidates for EL motion information coding. For example, the BL MVs and BL MVPs can be added to the MVP list in AMVP and/or the Merge candidate list. In an embodiment, the BL MV can be set as the first candidate in the AMVP/Merge candidate list for EL. The merge candidates of the corresponding PU in the BL can also be added to the Merge candidate list and/or the MVP list in AMVP. As mentioned above, the motion information may comprise various elements such as the CU prediction mode, the CU partitioning mode, the merging candidate index, the Inter prediction flag, the reference picture index, the motion vectors, and the MVP index, Merge candidates. Each element is referred to as an information piece in this disclosure.

The BL information associated with the selected MVP index, Merge candidate index, and Intra prediction mode index can be utilized to adaptively change the index order in the EL MVP list, merging index list, and Intra most probable mode list. For example, in the HEVC Test Model Version 6.0 (HM-6.0), the order of the MVP list is {left MVP, above MVP, collocated MVP}. If the corresponding BL PU selects the above MVP, the order of the above EL MVP will be moved forward. The EL MVP list will be {above MVP, left MVP, collocated MVP}. The BL MV, scaled MV, MVP candidates, scaled MVP candidates, Merge candidates, and scaled Merge candidates can replace some of the EL MVP candidates and/or Merge candidates. For example, the BL MV can replace the temporal collocated MV for the derivation of the AMVP/Merge candidates. The BL information refers to motion information associated with a block in the BL and the EL MVP list refers to an MVP list for the EL.

When the current PU contains more than one collocated blocks in the BL, motion vectors associated with the collocated blocks can be used to derive at least one inter-layer MVP or merge candidate. When there is more than one collocated blocks in the BL, a predefined search order can be used to derive said at least one inter-layer candidate of the MVP candidate list or the Merge candidate list from said more than one collocated blocks in the BL.

When motion information is not available for motion vector prediction in the EL, the corresponding motion information in the BL can be used. For example, if the MV of the upper-right block is unavailable, the MV of the corresponding block of the upper-right block in the BL can be used.

The BL MV, MVP candidates, and Merge candidates include the MV, MVP candidates, Merge candidates of the corresponding block in the BL. The BL MV, MVP candidates, and Merge candidates may also include the MV, MVP candidates, and Merge candidates of the neighboring blocks of the corresponding block in the BL. For example, the neighboring block may correspond to the bottom-left block in the BL.

In order to improve the coding efficient, redundancy check with (up-sampled) base layer motion vector should be performed. If (up-sampled) base layer motion vector is put in front of spatial and temporal Merge/AMVP candidates, for the spatial and temporal Merge/AMVP candidates, the equivalent check with (up-sampled) base layer motion vector should be performed. If the spatial or temporal Merge/AMVP candidate is the same as the (up-sampled) base layer motion vector, it should be removed. On the other hand, if (up-sampled) base layer motion vector is put after spatial and temporal Merge/AMVP candidates, the equivalent check should be performed as well.

Intra Prediction The BL Intra prediction mode information can be exploited for predicting the EL Intra prediction mode information. The Intra prediction mode of the corresponding PU in the BL can be added to the most probable mode (MPM) list for Intra mode coding. In an embodiment, the BL Intra prediction mode can be set as the first most probable mode in the most probable mode list.

In one embodiment, the Intra prediction mode order in the EL is adjusted according to the Intra mode in the BL. The neighboring directional modes of the BL Intra prediction mode may also be added to the Intra most probable mode list. In another embodiment, the remaining Intra prediction modes with prediction directions close to the prediction direction of the BL Intra mode are assigned shorter codewords.

In yet another embodiment, Intra prediction is performed using the constrained Intra prediction mode for all the bit-stream layers except for the highest EL.

In yet another embodiment, to simplify the CU structure, the inter-layer Intra prediction mode can be included as one of the Intra prediction modes in the EL. The inter-layer Intra prediction is to use the upsampled BL reconstructed texture as the predictors for the EL.

Residual Quadtree Information Reuse The residual quadtree partition and coded block pattern (CBP) of the corresponding CU in the BL can be scaled and utilized to derive EL residual quadtree partition and CBP coding.

Texture Information Reuse In the H.264/AVC scalable extension, 4-taps and 2-taps FIR filters are adopted for the up-sampling operation of texture signal for luma and chroma components respectively. Embodiments of the present invention use other up-sampling methods for HEVC SVC extension to replace the 4-taps and 2-taps FIR filters in H.264/AVC extension. The up-sampling filter can be one of the following filters or the combination of the following filters: discrete cosine transform interpolation filter (DCTIF), discrete sine transform interpolation filter (DSTIF), Wiener filter, non-local mean filter, smoothing filter, adaptive resampling filter, and bilateral filter. In one embodiment, the up-sampling filter is an adaptive filter and is adaptive to the decoded BL information, which includes BL texture and BL Intra prediction mode. For example, a directional interpolation filter can be used for up-sampling with the filtering orientation determined by the BL texture or Intra prediction mode information from the corresponding BL CU and its neighboring region. The filter can cross CU, PU or TU boundaries or be restricted within CU, PU or TU boundaries.

The padding and deblocking procedures in inter-layer Intra prediction can be skipped to reduce computation and data dependency problems. The sample adaptive offset (SAO) and adaptive loop filter (ALF) in the BL can also be skipped. The skipping of padding, deblocking, SAO, and ALF can be performed on the entire CTB, or leaf CU, or PU, or TU, or pre-defined region, or LCU boundary, or leaf CU boundary, or PU boundary, or TU boundary, or boundary of pre-defined region. The CTB-based or CU-based Wiener filter and/or adaptive offset can also be for inter-layer Intra prediction, where the filter and/or adaptive offset are applied to BL texture data or up-sampled BL texture data. In another embodiment, bi- or weighted-prediction can be applied when the texture information from the BL and the spatial texture information from the EL are combined.

Residual Information Reuse: In H.264/AVC SVC, 2-taps FIR filter is adopted for the up-sampling operation of residual signal for both luma and chroma components. In one embodiment, other up-sampling methods are used for scalable HEVC to replace the 2-taps FIR filter in H.264/AVC SVC. The filter can be one of the following filters or the combination of the following filters: discrete cosine transform interpolation filter (DCTIF), discrete sine transform interpolation filter (DSTIF), Wiener filter, non-local mean filter, smoothing filter, and bilateral filter. All the above filters can be restricted to cross TU boundaries or not.

The residual prediction can be performed in the spatial domain or the frequency domain regardless of whether the BL and the EL are in the same resolution.

In H.264/AVC SVC, the inter-layer residual prediction is only applied to the Inter MB types. In the present invention for the HEVC SVC extension, inter-layer residual prediction can be applied to both Inter and Intra CUs.

Entropy Coding Data Information Reuse The BL information can be utilized for the entropy coding in the EL. In CABAC, the context assignment can exploit the information of the BL. The EL can use different context models, or different context formation methods, or different context sets based on the corresponding information in the BL. For example, the EL PU can use different context models based on whether the corresponding PU in the BL is coded in the Skip mode or not.

In CABAC, the probability and most probable symbol (MPS) of part of the context models in the BL can be reused to derive the initial probability and MPS of part of context models in the EL.

ALF Information Reuse Some information of ALF in the BL, such as filter adaptation mode, filter coefficients, filter footprint, region partition, on/off decision, or Merge results can be shared or utilized to derive the information of ALF in the EL. For example, the EL can use the ALF parameters for the BL as the ALF parameters for the EL, or extract the EL ALF parameters from the corresponding BL ALF parameters, such that the transmission of the EL ALF parameters can be skipped. In another embodiment, the BL ALF parameters can be used as predictors for deriving the corresponding EL ALF parameters. Therefore, only the prediction difference needs to be coded and transmitted.

SAO Information Reuse Some information of SAO in the BL, such as offset type, offsets, region partition, on/off decision, or Merge results can be shared or utilized to derive the information of SAO in the EL. For example, the EL can use part of the SAO parameters in the BL as the SAO parameters in the EL. The transmission of these parameters can be skipped or reduced.

DF Information Reuse Some information of deblocking filter (DF) in the BL, such as threshold values (alpha, beta, etc.), can be shared or utilized to derive the information of DF in the EL.

Motion Data Compression In a SVC system with spatial scalability, the encoding or decoding of an enhancement layer may rely on motion data of the BL. Therefore, the motion data for the BL has to be stored after the BL is reconstructed so that the EL can use the motion data from the BL. To reduce the size of the motion data buffer, the motion compression process can be utilized to store the motion data associated with the reconstructed BL at reduced resolution (i.e., motion data stored for larger block size). While a conventional SVC system applies compression of the motion data associated with a current layer after the current layer is reconstructed and before the next layer is processed (i.e., encoded or decoded), embodiments of the present invention apply compression to the motion data associated with the current layer after all layers of the same access unit are processed. Therefore, embodiments of the present invention have more motion data available for better coding efficiency. The compression of motion data can selectively store CU prediction modes (Intra or Inter), Inter prediction flags (for deriving Pred_L0, Pred_LC or Pred_BI), reference picture indices and motion vectors on a larger granularity instead of the smallest unit (SU).

In one embodiment, only one representative motion is stored for each motion compression region containing N×N SUs of motion data. The control parameter of compression ratio N can be predefined or explicitly signaled at slice level (e.g. slice header), picture level (e.g. PPS, APS) or sequence level (e.g. SPS). The representative motion data can be selected from motion data of one of the N×N SUs. In another example, the representative motion data can be derived according to majority motion data of the N×N SUs.

Figure 4:
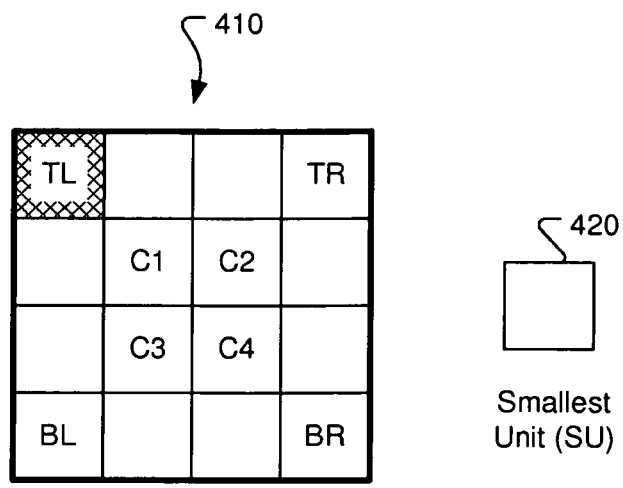
FIG. 4 illustrates positions of small units within a compression region to derive representative motion data according to an embodiment of the present invention.

An example of motion data compression incorporating an embodiment of the present invention is shown in FIG. 4. In this example, the MV compression is performed for each compression region 410 containing 4×4 SUs (i.e., 16 SUs), where the size of smallest unit is shown by block 420. All SUs within this compression region share a same CU prediction mode, Inter prediction flag, reference picture indices and motion vectors of the representative block. If the size of SU is 4×4, the size of the compression region is 16×16. In this example, the top left (TL) SU is used as the representative block for the whole compression region. Any other SU, such as the central sub-blocks C1 (top-left-to-the center sub-block), C2 (top-right-to-the center sub-block), C3 (bottom-left-to-the center sub-block) and C4 (bottom-right-to-the center sub-block) or corner sub-blocks TR (top-right), BL (bottom-left) and BR (bottom-right) can also be selected as the representative SU. The position of the representative SU can be predefined or explicitly signaled at the slice level (e.g. slice header), picture level (e.g. PPS, APS) or sequence level (e.g. SPS).

A syntax element to indicate the use of representative motion vector can be implicitly inferred or explicitly signaled after each layer is reconstructed or after all layers within the same access unit are reconstructed. The syntax can be signaled at the slice level (e.g. slice header), picture level (e.g. PPS, APS) or sequence level (e.g. SPS).

Improvement on Parallelized Merge/Skip Mode In the present invention, methods to provide functionalities such as reduction of memory usage and improvement on parallelized Merge/Skip mode are disclosed. Parallel Merge/Skip is adopted in HEVC to offer flexibility for high throughput. An embodiment of the present invention adds a high-level syntax element to signal the parallel Merge/Skip mode. Each picture/slice is divided into parallel motion estimation regions (MERs) and only those neighboring PUs that belong to different MERs from the current PU are allowed to be included in the Merge/Skip MVP candidate list construction process.

An embodiment of the present invention compensates the quality loss of parallel Merge/Skip when coding the EL pictures. If a neighboring PU and the current PU belong to the same MER, the corresponding PUs in the BL can be used as an alternative.

MV Syntax Prediction For each PU or CU in HEVC, an index associated with MV prediction candidate in the candidate list is coded to inform the decoder which candidate is selected. For example, Merge index is used to indicate which Merge candidate is applied for this PU, and Advanced Motion Vector Predictor (AMVP) index is used to indicate which motion vector should be used as motion vector prediction. In general, the information of the corresponding block in the base layer is highly correlated to those of the current PU in the enhancement layer. For example, the motion vector from the base layer is most likely selected as the motion vector predictor for the current block in the enhancement layer. In order to reduce the side information associated with the index selection, an embodiment of the present invention uses one flag, inferred_idx_flag, for each LCU. When inferred_index_flag is equal to 1, no selection index including Merge index, motion vector predictor index, Intra mode index, etc., is coded in this LCU. In this case, the related indices in this LCU will be set to a predefined index, e.g. 0. When inferred_index_flag is equal to 0, the selection index will be coded.

Constrained Motion Vector Difference In HEVC, the range of the motion vector difference (MVD) is constrained by the profile and level. The syntax of the MVD consists of prefix bits (i.e., syntax element Pre-fix-bits), unary plus Exp-Golomb codes (i.e., syntax element UEG1) and a sign bit (i.e., syntax element 1-SignBit). For example, if MVD is zero, then the codeword "0" is code; and if MVD is "1", then the codeword "101" is coded. In SVC, up-sampled base layer motion vector can be used as one of the Merge or AMVP candidates. However, the motion vector from the base layer should be very close to that in the enhancement layer if both the base-layer motion vector and the enhancement-layer motion vector correspond to true motion. If the original MVD syntax is used to represent the MVD between the base layer and the enhancement layer, the corresponding coded bits will not be efficient. The MVD of the base layer motion vector should be constrained within a certain range. Therefore, an embodiment of the present invention constrains the motion vector difference to reduce the side information in this case. For example, one flag can be used to indicate whether MVD is equal to zero or not and the range of MVD is also limited within [−1, 1]. Therefore, fewer bits are required to represent MVD. When MVD is "−1", only two bits are needed to represent the MVD. First, one flag is coded to indicate that the MVD is not zero. The flag is followed by one sign bit to indicate the value of the MVD as "−1". This constraint can be applied to the MVD between the base layer and the enhancement layer as an additional constraint. This constraint can also be applied to some pre-defined motion vector predictor index as an additional constraint. In other words, when a pre-defined motion vector predictor index (e.g. index 0 in AMVP) is selected, the range of MVD is constrained. The MVD constraint can also be applied to Merge mode coding. For example, if the up-sampled base layer Merge candidate or the Merge candidate with index 0 is selected, the refinement MVD can be sent.

The syntax/codeword of the refinement MVD can be derived by refining only one direction (Method 1: refine one direction only). For example, one flag is signaled to determine whether the MVD is all zero or not. If the MVD is not all zero, only one direction MVD can be refined. The codeword design can be (Zero MVD flag+fixed-length code) or (Zero MVD flag+x/y_refine_flag+refinement_value+sign bit). The following table shows an example of codeword table of (Zero MVD flag+fixed-length code).

| MVD | Code word |
|---|---|
| (0, 0) | 0 |
| (1, 0) | 100 |
| (−1, 0) | 101 |
| (0, 1) | 110 |
| (0, −1) | 111 |

Alternatively, the syntax/codeword of the refinement MVD can be derived by refining two directions (Method 2: truncated MVD coding). For example, the refinement value and sign for each direction is coded. The codeword can be designed as (refinement_value for MVD_x, sign for MVD_x, refinement_value for MVD_y, sign for MVD_y).

| MVD_x/y | Code word |
|---|---|
| 0 | 0 |
| 1 | 10 |
| −1 | 11 |

The MVD refinement can be explicitly signaled or implicitly inferred. The MVD refinement value can be inferred based on the neighboring block information and the BL information. For example, the MV or MVD of the neighboring blocks in quarter pixel unit are (−1, 1), the MVD refinement value can be inferred as (−1, 1).

Figure 5:
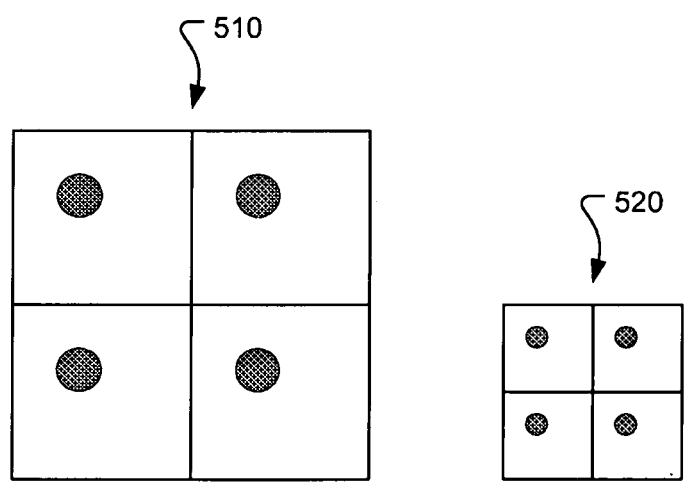
FIG. 5 illustrates an example of motion vector derivation for inter-layer motion prediction using multiple base layer motion vectors.

Motion Vector Derivation from Base Layer: In SVC, the motion vector in the base layer can be used in the enhancement layer for inter-layer motion prediction. In traditional method, motion vector for the enhancement layer can be derived from the base layer by mapping a selected point (e.g. center position) in a PU of the enhancement layer to the base layer. The motion vector of the PU in the base layer that includes this position will be used as the motion vector for the enhancement layer. However, when the PU boundaries in the enhancement layer and the base layer are not aligned or the resolution ratio between the enhancement and base layers are not a power of two, the PU in the enhancement layer will cover several PUs in the base layer. In this case, only one motion vector among the covered PUs in the base layer will be used for the PU in the enhancement layer. An embodiment of the present invention derives the motion vector associated with inter-layer motion prediction by referring multiple base-layer motion vectors. For example, as shown in FIG. 5, an enhancement layer PU 510 is divided into four blocks. The center point of each block is the reference point. For each block, the collocated point of the reference point in the base layer is derived. The motion vectors of collocated reference points in the base layer are utilized to derive the motion vector of inter-layer motion prediction. For example, a majority vote can be used. The motion vector with most occurrences can be regarded as the motion vector of inter-layer motion prediction.

Motion Vector Derivation With Redundancy Check In SVC, the motion vector of the base layer can be used in the enhancement layer for inter-layer motion prediction. The (up-sampled) base layer motion vector can be included in the Merge or AMVP candidate list. In order to improve the coding efficient, redundancy check with (up-sampled) base layer motion vector should be performed. If (up-sampled) base layer motion vector is already included when a spatial or temporal Merge/AMVP candidate is being added to the Merge/AMVP candidate list, redundancy check is performed on the spatial or temporal Merge/AMVP candidate. If the spatial or temporal Merge/AMVP candidate is the same as the (up-sampled) base layer motion vector, it should be removed from the Merge/AMVP candidate list. Similarly, if the spatial or temporal Merge/AMVP candidates are already added to the Merge/AMVP candidate list, redundancy check is performed on the (up-sampled) base layer motion vector. If there is more than one inter-layer candidate, redundancy check is performed to the more than one inter-layer candidate.

Inter-Layer Residual Prediction Flag Coding In H.264/SVC, the inter-layer residual prediction is utilized to reduce the information of enhancement layer residual. The collocated residual of the base layer can be used block-wise as predictors for the residual of the current macroblock in the enhancement layer. In HEVC, the coding unit (CU), prediction unit (PU), and transform unit (TU) are used. A CU can contain several PUs and TUs. If inter-layer residual prediction is only applied in the CU level, it may not be efficient. Inter-layer residual prediction should be applied for smaller blocks. An embodiment of the present invention applies the inter-layer residual prediction in the PU-level, TU-level, or sub-CU-level. In the PU level, an inter-layer residual prediction flag is signaled for each PU. In the TU level, an inter-layer residual prediction flag is signaled for each leaf TU. For the sub-CU level, a residual prediction unit (RPU) is defined. For a TU larger than or equal to the RPU, an inter-layer residual prediction flag is signaled. For TUs within the same RPU, an inter-layer residual prediction flag is signaled. All the TUs within the same RPU share the same inter-layer residual prediction flag.

Figure 6:
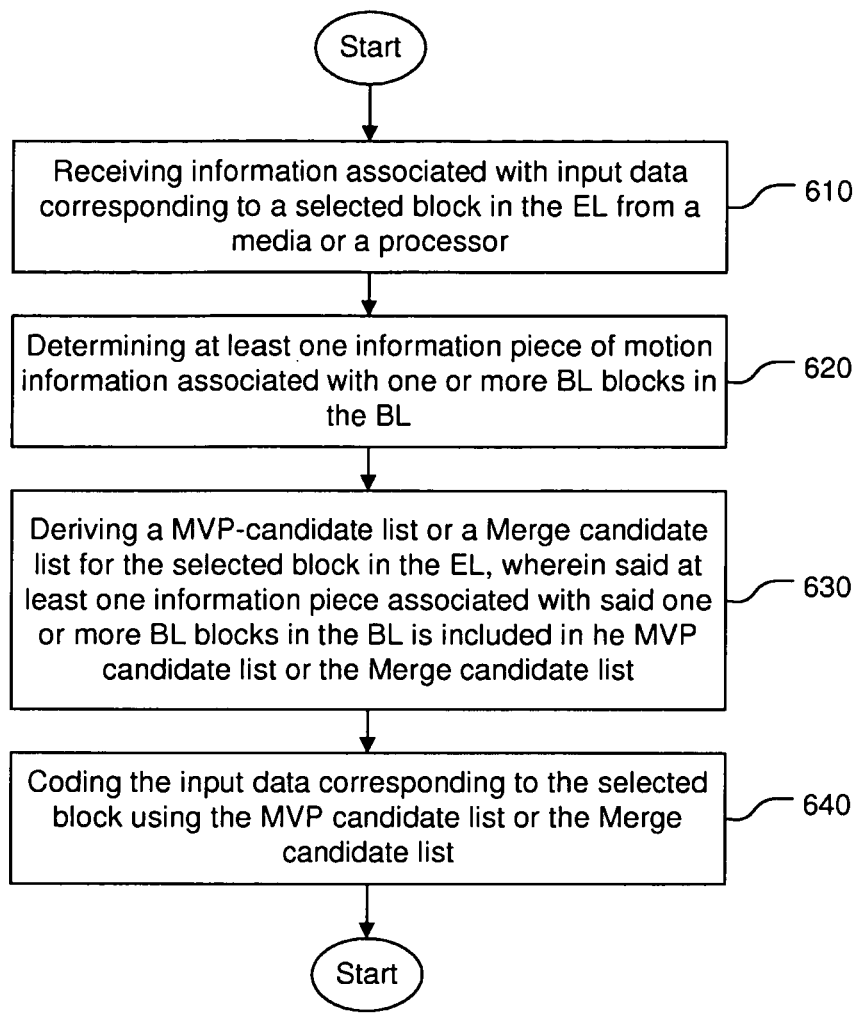
FIG. 6 illustrates an exemplary flowchart of a scalable video coding system according to an embodiment of the present invention.

FIG. 6 illustrates an exemplary flowchart of a scalable coding system incorporating an embodiment of the present invention to code the enhancement layer. The process is applied to a system where the video data is configured into a Base Layer (BL) and an Enhancement Layer (EL) and the EL has higher spatial resolution or better video quality than the BL. The process starts with receiving information associated with input data corresponding to a selected block in the EL from a media or a processor as shown in step 610. For an encoder, the information associated with input data corresponding to a selected block may be stored in a media.

The media may be used as an input buffer and the input data is retrieved from the media in this case. The media may be computer memory, buffer (RAM or DRAM) or other storage devices/media. In hardware based implementation, the input data may be received from a processor such as a controller, a central processing unit, a digital signal processor, or electronic circuits. In a decoder, input data corresponding to a selected block in the EL is in a compressed form and needs to be decoded. At least one information piece of motion information associated with one or more BL blocks in the BL is identified as shown in step 620. A motion vector prediction (MVP) candidate list or a Merge candidate list for the selected block in the EL is determined as shown in step 630, wherein said at least one information piece associated with said one or more BL blocks in the BL is included in the MVP candidate list or the Merge candidate list. After the MVP candidate list or the Merge candidate list is derived, the input data corresponding to the selected block is then encoded or decoded using the MVP candidate list or the Merge candidate list as shown in step 640.

Figure 7:
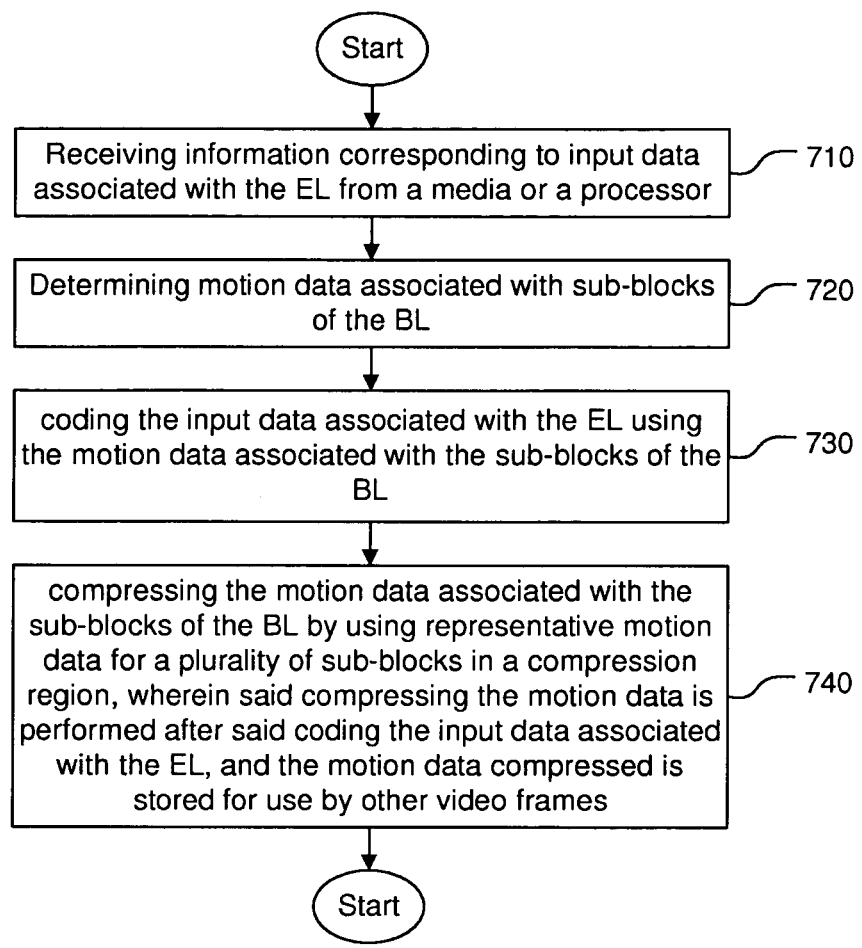
FIG. 7 illustrates another exemplary flowchart of a scalable video coding system according to an embodiment of the present invention.

FIG. 7 illustrates another exemplary flowchart of a scalable coding system incorporating an embodiment of the present invention to code the enhancement layer. The process is applied to a system where the video data is configured into a Base Layer (BL) and an Enhancement Layer (EL) and the EL has higher spatial resolution or better video quality than the BL. The process starts with receiving information corresponding to input data associated with the EL from a media or a processor as shown in step 710. Again, for an encoder, the information corresponding to input data associated with the EL may be stored in a media. The media may be used as an input buffer and the input data is retrieved from the media in this case. The media may be computer memory, buffer (RAM or DRAM) or other storage devices/media. In hardware based implementation, the input data may be received from a processor such as a controller, a central processing unit, a digital signal processor, or electronic circuits. In a decoder, input data corresponding to a selected block in the EL is in a compressed form and needs to be decoded. Motion data associated with sub-blocks of the BL is identified in step 720. The input data associated with the EL is then encoded or decoded using prediction information including the motion data associated with the sub-blocks of the BL as shown in step 730. The prediction information may include information associated with neighboring blocks in Intra coding. The prediction information may include information associated with other frames in Inter coding. After coding the input data associated with the EL is performed, the motion data associated with the sub-blocks of the BL is compressed by using representative motion data for a plurality of the sub-blocks in a compression region as shown in step 740, wherein the motion data compressed is stored for use by other video frames.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding video data using Inter prediction mode or Merge mode in a video coding system, wherein the video data is configured into a Base Layer (BL) and an Enhancement Layer (EL), and the EL has higher spatial resolution or better video quality than the BL, the method comprising:
    receiving information associated with input data corresponding to a selected block in the EL:
    identifying at least one information piece of motion information associated with one or more BL blocks in the BL;
    deriving a sorted motion vector prediction (MVP) candidate list or a sorted Merge candidate list for the selected block in the EL, including:
        placing, at a beginning of the MVP candidate list or at a beginning of the Merge candidate list, an inter-layer candidate corresponding to said at least one information piece associated with said one or more BL blocks in the BL;
        deriving a spatial or temporal candidate in the EL; and
        removing the derived spatial or temporal candidate from the MVP candidate list or the Merge candidate list if the derived spatial or temporal candidate is the same as the inter-layer candidate; and
    coding the input data corresponding to the selected block using the sorted MVP candidate list or the sorted Merge candidate list.

2. The method of claim 1, wherein said one or more BL blocks correspond to one or more blocks in the BL collocated with the selected block in the EL.

3. The method of claim 1, wherein an EL block collocated with the selected block in the EL is excluded from said deriving the MVP candidate list or the Merge candidate list for the selected block in the EL.

4. The method of claim 1, wherein an EL temporal collocated MVP or Merge candidate is excluded from said deriving the MVP candidate list or the Merge candidate list for the selected block in the EL.

5. The method of claim 1, wherein the motion information is associated with a first prediction unit (PU) in a previous or selected coded picture in the BL, a neighboring PU of the first PU, Merge candidates of the first PU, motion vector predictors of the first PU, or a collocated PU of the first PU, wherein the motion information comprises inter prediction direction, reference picture index, and motion vectors, and wherein the selected block in the EL corresponds to a selected PU in the EL.

6. The method of claim 1, wherein said at least one information piece corresponds to a BL motion vector, and the BL motion vector is scaled based on a resolution ratio of the EL to the BL.

7. The method of claim 1, wherein a flag is used to indicate whether complete motion information or partial motion information of the selected block in the EL is predicted based on the motion information associated with said one or more BL blocks in the BL.

8. The method of claim 1, wherein each candidate of the MVP candidate list or the Merge candidate list includes information associated with inter prediction direction, reference picture index and motion vector.

9. The method of claim 1, wherein said one or more BL blocks in the BL correspond to more than one collocated blocks in the BL, and motion vectors associated with said more than one collocated blocks are used to derive at least one inter-layer candidate of the MVP candidate list or the Merge candidate list.

10. The method of claim 9, wherein a predefined search order is used to derive said at least one inter-layer candidate of the MVP candidate list or the Merge candidate list from said more than one collocated blocks in the BL.

11. The method of claim 1, wherein if the motion information associated with the selected block in the EL is unavailable, the motion information associated with a corresponding block in the BL is used as the motion information associated with the selected block in the EL.

12. The method of claim 1, wherein if more than one inter-layer candidate associated with said one or more BL blocks in the BL, redundancy check with each other is performed on said more than one inter-layer candidate.

13. An apparatus for coding video data using Inter prediction mode or Merge mode in a video coding system, wherein the video data is configured into a Base Layer (BL) and an Enhancement Layer (EL), and the EL has higher spatial resolution or better video quality than the BL, the apparatus comprising:

receiving circuitry for receiving information associated with input data corresponding to a selected block in the EL;

identifying circuitry for identifying at least one information piece of motion information associated with one or more BL blocks in the BL;

deriving circuitry for deriving a sorted MVP candidate list or a sorted Merge candidate list for the selected block in the EL, the deriving circuitry being configured to:

place, at a beginning of the MVP candidate list or at a beginning of the Merge candidate list, an inter-layer candidate corresponding to said at least one information piece associated with said one or more BL blocks in the BL;

derive a spatial or temporal candidate in the EL; and remove the derived spatial or temporal candidate from the MVP candidate list or the Merge candidate list if the derived spatial or temporal candidate is the same as the inter-layer candidate; and coding circuitry for coding the input data corresponding to the selected block using the sorted MVP candidate list or the sorted Merge candidate list.

14. The apparatus of claim 13, wherein said one or more BL blocks correspond to one or more blocks in the BL collocated with the selected block in the EL.

* * * * *